(12) United States Patent
He et al.

(10) Patent No.: US 11,688,082 B2
(45) Date of Patent: Jun. 27, 2023

(54) COORDINATE GRADIENT METHOD FOR POINT CLOUD REGISTRATION FOR AUTONOMOUS VEHICLES

(71) Applicant: Baidu USA LLC, Sunnyvale, CA (US)

(72) Inventors: Runxin He, Sunnyvale, CA (US); Shiyu Song, Sunnyvale, CA (US); Li Yu, Sunnyvale, CA (US); Wendong Ding, Sunnyvale, CA (US); Pengfei Yuan, Sunnyvale, CA (US)

(73) Assignee: BAIDU USA LLC, Sunnyvale, CA (US)

( * ) Notice: Subject to any disclaimer, the term of this patent is extended or adjusted under 35 U.S.C. 154(b) by 887 days.

(21) Appl. No.: 16/692,960

(22) Filed: Nov. 22, 2019

(65) Prior Publication Data

US 2021/0158547 A1    May 27, 2021

(51) Int. Cl.
    *G06T 7/33*      (2017.01)
    *G06T 7/73*      (2017.01)
    *G01S 17/42*     (2006.01)
    *G01S 17/931*    (2020.01)
    *G01S 7/48*      (2006.01)

(52) U.S. Cl.
    CPC .............. *G06T 7/33* (2017.01); *G01S 7/4808* (2013.01); *G01S 17/42* (2013.01); *G01S 17/931* (2020.01); *G06T 7/73* (2017.01); *G06T 2207/10028* (2013.01); *G06T 2207/20072* (2013.01); *G06T 2207/20221* (2013.01); *G06T 2207/30252* (2013.01)

(58) Field of Classification Search
    CPC ..................................... G06T 7/33; G06T 7/73
    See application file for complete search history.

(56) References Cited

U.S. PATENT DOCUMENTS

2021/0248752 A1*    8/2021    Doemling ............... G06F 18/23

* cited by examiner

*Primary Examiner* — Jerry T Jean Baptiste
(74) *Attorney, Agent, or Firm* — Womble Bond Dickinson (US) LLP

(57) ABSTRACT

In one embodiment, a system and method for partitioning a region for point cloud registration of LIDAR poses of an autonomous driving vehicle (ADV) using a regional iterative closest point (ICP) algorithm is disclosed. The method determines the frame pair size of one or more pairs of related LIDAR poses of a region of an HD map to be constructed. If the frame pair size is greater than a threshold, the region is further divided into multiple clusters. The method may perform the ICP algorithm for each cluster. Inside a cluster, the ICP algorithm focuses on a partial subset of the decision variables and assumes the rest of the decision variables are fixed. To construct the HD map, the method may determine if the results of the ICP algorithms from the clusters converge. If the solutions converge, a solution to the point cloud registration for the region is found.

20 Claims, 10 Drawing Sheets

COORDINATE GRADIENT METHOD FOR POINT CLOUD REGISTRATION FOR AUTONOMOUS VEHICLES

TECHNICAL FIELD

Embodiments of the present disclosure relate generally to operating autonomous vehicles. More particularly, embodiments of the disclosure relate to methods for point clouds registration for autonomous driving vehicles (ADVs).

BACKGROUND

Vehicles operating in an autonomous mode (e.g., driverless) can relieve occupants, especially the driver, from some driving-related responsibilities. When operating in an autonomous mode, the vehicle can navigate to various locations using onboard sensors, allowing the vehicle to travel with minimal human interaction or in some cases without any passengers.

Motion planning and control are critical operations in autonomous driving. The accuracy and efficiency of motion planning and control operations depends on the sensors of the vehicle and a high-definition (HD) two-dimensional (2D) or three-dimensional (3D) point cloud map of the area to navigate. Sensors such as cameras, light detection and range (LIDAR) units, radars, etc., are used to capture video and electromagnetic images of environments around the vehicle. The ADV may process information captured by the sensors and traffic elements provided by the HD 3D point cloud map to perceive driving environment surrounding the ADV for planning the motion of the ADV.

Sensors such as a LIDAR sensor is also used to capture data points of an area to be mapped. The data points are referred to as a point cloud and correspond to a pose (e.g., position and orientation) of the LIDAR sensor at a particular point in time. Point clouds captured by the LIDAR sensor at many poses are used to construct the HD 3D point cloud map of the area. Point cloud registration refers to a process of estimating the LIDAR's GPS positions and poses during the data capture phase to align point clouds of the area to be mapped. Alignment of the point cloud data allows an accurate HD 3D point cloud map to be constructed from blur areas in the raw point cloud map.

However, several problems exist which influence both the performance and accuracy of map construction. First, current point cloud registration algorithms are highly dependent on GPS signals for vehicle's simultaneous localization, which can have a margin of errors in the orders of meters. The errors are exacerbated by multi-path and other degradation of the GPS signals due to city streets lined by tall buildings or dense forest. Or the GPS signal may fail to be received altogether, for example, in tunnels or garages. Second, the registration of point clouds may be computationally complex, e.g., challenging and time-consuming for large map areas. To reduce the complexity, the map area may be divided into sub-maps and point cloud registration for a sub-map may be implemented on a corresponding computation node using a regional iterative closest point (ICP) algorithm. However, the size of a sub-map may be limited by a corresponding computation node's memory size, which in turn influences the point cloud registration map's accuracy. It is desirable to have a more flexible approach for partitioning the map area into sub-maps for point cloud registration that is not limited by the computation node's memory.

BRIEF DESCRIPTION OF THE DRAWINGS

Embodiments of the disclosure are illustrated by way of example and not limitation in the figures of the accompanying drawings in which like references indicate similar elements.

DETAILED DESCRIPTION

Figure 1:
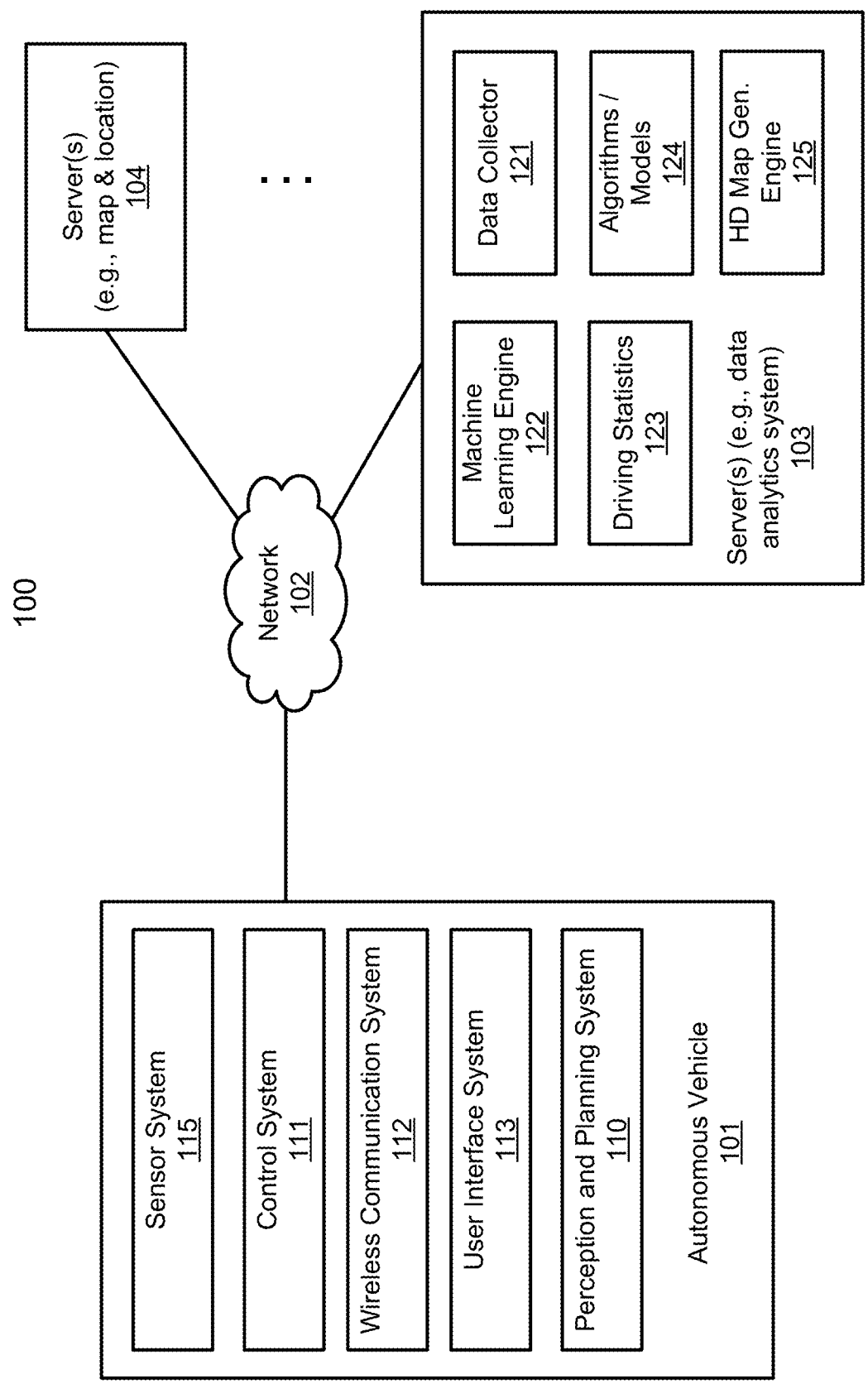
FIG. 1 is a block diagram illustrating a networked system according to one embodiment.

Various embodiments and aspects of the disclosures will be described with reference to details discussed below, and the accompanying drawings will illustrate the various embodiments. The following description and drawings are illustrative of the disclosure and are not to be construed as limiting the disclosure. Numerous specific details are described to provide a thorough understanding of various embodiments of the present disclosure. However, in certain instances, well-known or conventional details are not described in order to provide a concise discussion of embodiments of the present disclosures.

Reference in the specification to "one embodiment" or "an embodiment" means that a particular feature, structure, or characteristic described in conjunction with the embodiment can be included in at least one embodiment of the disclosure. The appearances of the phrase "in one embodiment" in various places in the specification do not necessarily all refer to the same embodiment.

Reference in the specification to "HD", or "high definition" such as HD map or HD poses refers to maps or poses with a very high precision level. For example, HD maps can have a precision level of centimeters or tens of centimeters. A 2D or 3D HD point cloud map of a navigable area stores the traffic elements for motion planning and control of an ADV such as features for localization and perception.

Point cloud registration during construction of the HD point cloud map estimates the LIDAR's GPS positions and poses during the data capture phase to align point clouds of the area to be mapped. After alignment of the point cloud data, an HD 2D or 3D point cloud map may be constructed from the raw point cloud map. To reduce the computational complexity of the point cloud registration, the map area may be divided into smaller partitions or sub-maps. Point cloud registration for the sub-map may be implemented in parallel on computation nodes of a computing cluster using the regional iterative closest point (ICP) algorithm. The computational nodes of the computing cluster may have different memory resources, affecting the computational speed of the ICP algorithm and the accuracy of the constructed HD point cloud map. To reduce the dependencies of the accuracy of the map on the memory resources of the computational nodes, a method for ICP algorithm for a region is disclosed.

According to one embodiment, a method to partition a region for regional ICP in point cloud registration is disclosed. The method determines the frame pair size of decision variables, such as the frame pair size of a pair of related LIDAR poses of a region of an HD map to be constructed. In one embodiment, the frame pair size may be the geometric distance between the pair of LIDA poses. The region may be a sub-map or a partition of the HD map, or may be an entirety of the HD map. If the frame pair size is greater than a threshold, the region is further divided into multiple clusters. In one embodiment, the threshold may be a function of the size of the memory of a computational node. The method may perform the ICP algorithm for each of the clusters. In one embodiment, the ICP algorithm is implemented by solving a bundle adjustment equation. Dividing the region into a number of clusters may mean separately solving the bundle adjustment equation for each of the clusters. Inside a cluster, the ICP algorithm focuses on a partial subset of the decision variables and assumes the rest of the decision variables are fixed. For example, if one LIDAR pose of the frame pair is inside the cluster and the other LIDAR pose of the frame pair is outside the cluster, the method regards the LIDAR pose outside of the cluster as a constant when implementing the ICP algorithm. If the frame pair size is not greater than the threshold, the region is not divided into clusters and the method may directly implement the ICP algorithm by solving the bundle adjustment equation on the region. To construct the HD map, the method may determine if the results of the ICP problem, for example, if the solutions of the bundle adjustment equations for the clusters, converge. If the solutions converge, a solution to the point cloud registration for the region is found. Otherwise, if the solution does not converge, the method may recalculate the frame pair size of a different pair of LIDAR poses, use a different metric to calculate the frame pair size of the decision variables, or change the threshold.

According to one embodiment, the method may determine the frame pair size of LIDAR poses of a region for a regional ICP in point cloud registration. The method may compare the frame pair size with a threshold. If the frame pair size is greater than the threshold, the method may separate the region into K clusters. The method may separately implement the ICP algorithm in each of the K clusters of the region. If the frame pair is not greater than the threshold, the method may implement the ICP algorithm in the entire region. The method may merge the results of the ICP algorithm from the K clusters using a pose graph algorithm.

FIG. 1 is a block diagram illustrating an autonomous vehicle network configuration according to one embodiment of the disclosure. Referring to FIG. 1, network configuration 100 includes autonomous vehicle 101 that may be communicatively coupled to one or more servers 103-104 over a network 102. Although there is one autonomous vehicle shown, multiple autonomous vehicles can be coupled to each other and/or coupled to servers 103-104 over network 102. Network 102 may be any type of networks such as a local area network (LAN), a wide area network (WAN) such as the Internet, a cellular network, a satellite network, or a combination thereof, wired or wireless. Server(s) 103-104 may be any kind of servers or a cluster of servers, such as Web or cloud servers, application servers, backend servers, or a combination thereof. Servers 103-104 may be data analytics servers, content servers, traffic information servers, map and point of interest (MPOI) servers, or location servers, etc. In one embodiment, autonomous vehicle 101 may download HD maps from servers 103 or 104 for use in motion planning and control.

An autonomous vehicle refers to a vehicle that can be configured to in an autonomous mode in which the vehicle navigates through an environment with little or no input from a driver. Such an autonomous vehicle can include a sensor system having one or more sensors that are configured to detect information about the environment in which the vehicle operates. The vehicle and its associated controller(s) use the detected information to navigate through the environment. Autonomous vehicle 101 can operate in a manual mode, a full autonomous mode, or a partial autonomous mode.

In one embodiment, autonomous vehicle 101 includes, but is not limited to, perception and planning system 110, vehicle control system 111, wireless communication system 112, user interface system 113, and sensor system 115. Autonomous vehicle 101 may further include certain common components included in ordinary vehicles, such as, an engine, wheels, steering wheel, transmission, etc., which may be controlled by vehicle control system 111 and/or perception and planning system 110 using a variety of communication signals and/or commands, such as, for example, acceleration signals or commands, deceleration signals or commands, steering signals or commands, braking signals or commands, etc.

Components 110-115 may be communicatively coupled to each other via an interconnect, a bus, a network, or a combination thereof. For example, components 110-115 may be communicatively coupled to each other via a controller area network (CAN) bus. A CAN bus is a vehicle bus standard designed to allow microcontrollers and devices to communicate with each other in applications without a host computer. It is a message-based protocol, designed originally for multiplex electrical wiring within automobiles, but is also used in many other contexts.

Figure 2:
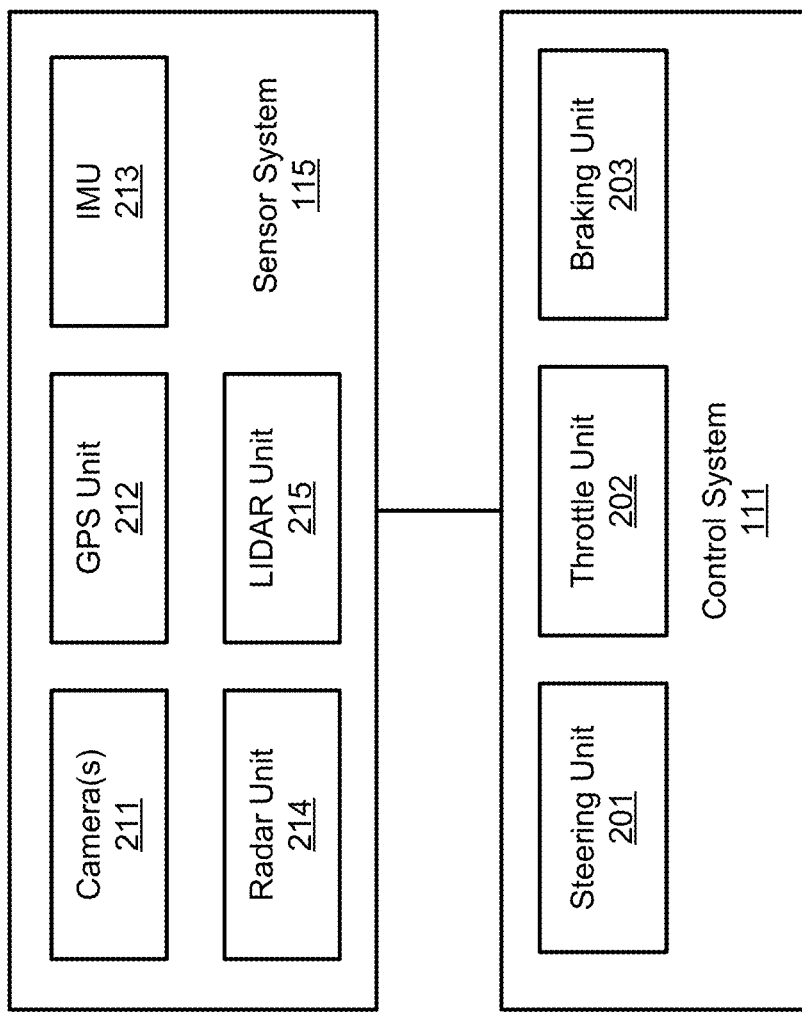
FIG. 2 is a block diagram illustrating an example of an autonomous vehicle according to one embodiment.

Referring now to FIG. 2, in one embodiment, sensor system 115 includes, but it is not limited to, one or more cameras 211, global positioning system (GPS) unit 212, inertial measurement unit (IMU) 213, radar unit 214, and a light detection and range (LIDAR) unit 215. GPS system 212 may include a transceiver operable to provide information regarding the position of the autonomous vehicle. IMU unit 213 may sense position and orientation changes of the autonomous vehicle based on inertial acceleration. Radar unit 214 may represent a system that utilizes radio signals to sense objects within the local environment of the autonomous vehicle. In some embodiments, in addition to sensing objects, radar unit 214 may additionally sense the speed and/or heading of the objects. LIDAR unit 215 may sense objects in the environment in which the autonomous vehicle is located using lasers. LIDAR unit 215 could include one or more laser sources, a laser scanner, and one or more detectors, among other system components. Cameras 211 may include one or more devices to capture images of the environment surrounding the autonomous vehicle. Cameras 211 may be still cameras and/or video cameras. A camera may be mechanically movable, for example, by mounting the camera on a rotating and/or tilting a platform.

Sensor system 115 may further include other sensors, such as, a sonar sensor, an infrared sensor, a steering sensor, a throttle sensor, a braking sensor, and an audio sensor (e.g., microphone). An audio sensor may be configured to capture sound from the environment surrounding the autonomous vehicle. A steering sensor may be configured to sense the steering angle of a steering wheel, wheels of the vehicle, or a combination thereof. A throttle sensor and a braking sensor sense the throttle position and braking position of the vehicle, respectively. In some situations, a throttle sensor and a braking sensor may be integrated as an integrated throttle/braking sensor.

In one embodiment, vehicle control system 111 includes, but is not limited to, steering unit 201, throttle unit 202 (also referred to as an acceleration unit), and braking unit 203. Steering unit 201 is to adjust the direction or heading of the vehicle. Throttle unit 202 is to control the speed of the motor or engine that in turn control the speed and acceleration of the vehicle. Braking unit 203 is to decelerate the vehicle by providing friction to slow the wheels or tires of the vehicle. Note that the components as shown in FIG. 2 may be implemented in hardware, software, or a combination thereof.

Referring back to FIG. 1, wireless communication system 112 is to allow communication between autonomous vehicle 101 and external systems, such as devices, sensors, other vehicles, etc. For example, wireless communication system 112 can wirelessly communicate with one or more devices directly or via a communication network, such as servers 103-104 over network 102. Wireless communication system 112 can use any cellular communication network or a wireless local area network (WLAN), e.g., using WiFi to communicate with another component or system. Wireless communication system 112 could communicate directly with a device (e.g., a mobile device of a passenger, a display device, a speaker within vehicle 101), for example, using an infrared link, Bluetooth, etc. User interface system 113 may be part of peripheral devices implemented within vehicle 101 including, for example, a keyboard, a touch screen display, a microphone, and a speaker, etc.

Some or all of the functions of autonomous vehicle 101 may be controlled or managed by perception and planning system 110, especially when operating in an autonomous driving mode. Perception and planning system 110 includes the necessary hardware (e.g., processor(s), memory, storage) and software (e.g., operating system, planning and routing programs) to receive information from sensor system 115, control system 111, wireless communication system 112, and/or user interface system 113, process the received information, plan a route or path from a starting point to a destination point, and then drive vehicle 101 based on the planning and control information. Alternatively, perception and planning system 110 may be integrated with vehicle control system 111.

For example, a user as a passenger may specify a starting location and a destination of a trip, for example, via a user interface. Perception and planning system 110 obtains the trip related data. For example, perception and planning system 110 may obtain location and route information from an MPOI server, which may be a part of servers 103-104. The location server provides location services and the MPOI server provides map services and the POIs of certain locations. Alternatively, such location and MPOI information may be cached locally in a persistent storage device of perception and planning system 110. In one embodiment, the location and MPOI information may be obtained from HD maps downloaded from servers 103-104.

While autonomous vehicle 101 is moving along the route, perception and planning system 110 may also obtain real-time traffic information from a traffic information system or server (TIS). Note that servers 103-104 may be operated by a third party entity, such as a service provider that downloads a starting position and a destination position to perception and planning system 110 for perception and planning system 110 to plan a route. The third party may also issue commands to perception and planning system 110 to command autonomous vehicle 101 to start traveling on the planned route. Alternatively, the functionalities of servers 103-104 may be integrated with perception and planning system 110. Based on the real-time traffic information, MPOI information, and location information, as well as real-time local environment data detected or sensed by sensor system 115 (e.g., obstacles, objects, nearby vehicles), perception and planning system 110 can plan an optimal route and drive vehicle 101, for example, via control system 111, according to the planned route to reach the specified destination safely and efficiently.

Server 103 may be a data analytics system to perform data analytics services for a variety of clients. In one embodiment, data analytics system 103 includes data collector 121 and machine learning engine 122. Data collector 121 collects driving statistics 123 from a variety of vehicles, either autonomous vehicles or regular vehicles driven by human drivers. Driving statistics 123 include information indicating the driving commands (e.g., throttle, brake, steering commands) issued and responses of the vehicles (e.g., speeds, accelerations, decelerations, directions) captured by sensors of the vehicles at different points in time. Driving statistics 123 may further include information describing the driving environments at different points in time, such as, for example, routes (including starting and destination locations), MPOIs, road conditions, weather conditions, etc. Driving statistics 123 may further include point clouds information such as point clouds images of the features and objects of the driving environment captured by LIDAR sensors mounted on the vehicles, and corresponding poses captured by IMU and GPS sensors describing a position and orientation of the vehicles.

Based on driving statistics 123, machine learning engine 122 generates or trains a set of rules, algorithms, and/or predictive models 124 for a variety of purposes. In one embodiment, algorithms 124 may include regional ICP algorithms, bundle adjustment algorithms, alternating direction method of multipliers (ADMM) algorithms, image segmentation algorithms (e.g., edge detection, motion detection, etc.), simultaneous localization and mapping (SLAM) algorithms, deep learning neural network models.

Algorithms 124 may be uploaded on ADVs to be utilized during autonomous driving in real-time or may be utilized by other modules such as HD map generation engine 125 of server 103. In one embodiment, HD map generation engine 125 can register the point clouds collected by the ADVs and generate a HD map based on the registered point clouds. Although HD map generation engine 125 is shown as part of server 103, in some embodiments, engine 125 may be part of server 104.

Figure 3A:
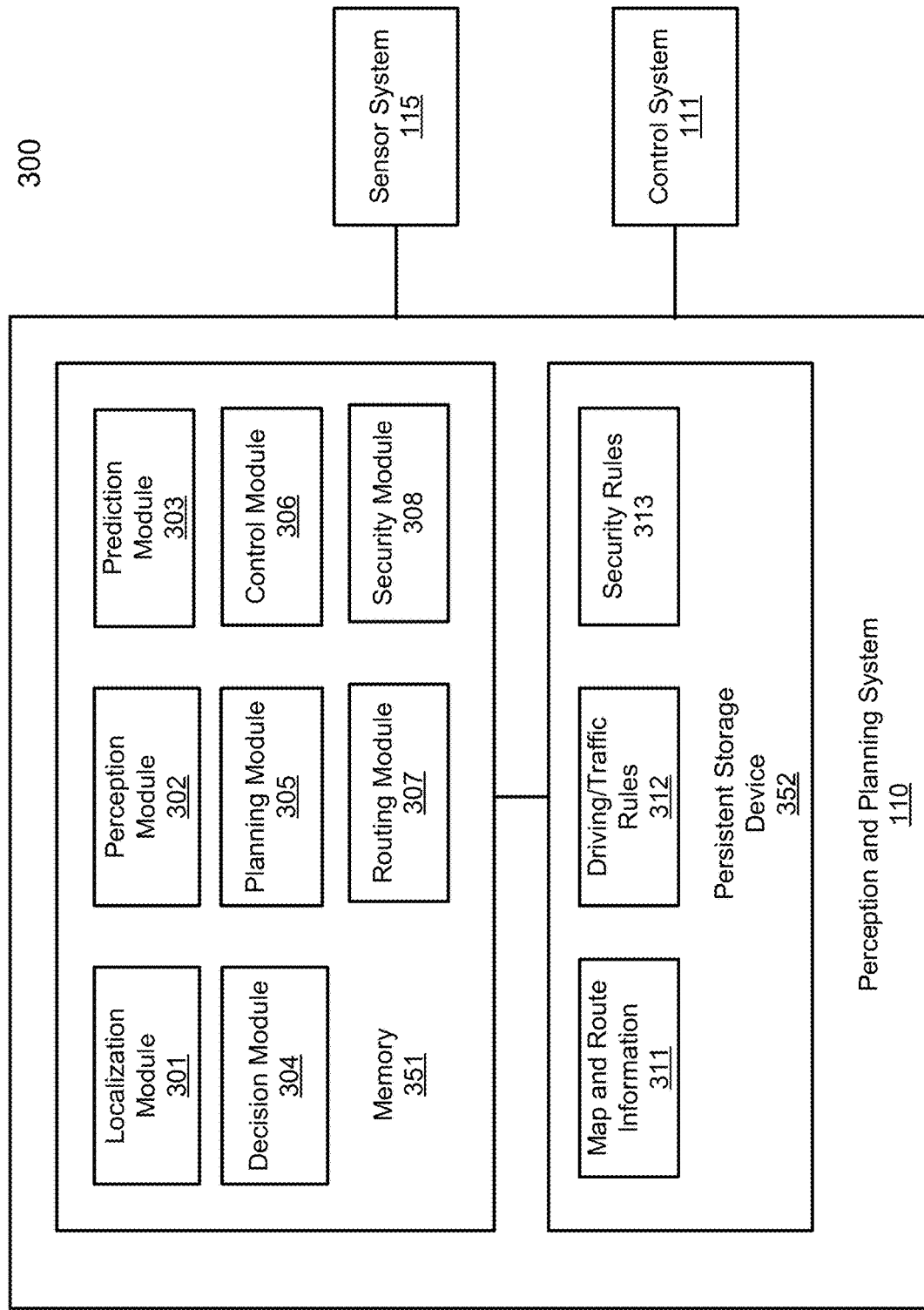
FIGS. 3A-3B are block diagrams illustrating an example of a perception and planning system used with an autonomous vehicle according to one embodiment.
Figure 3B:
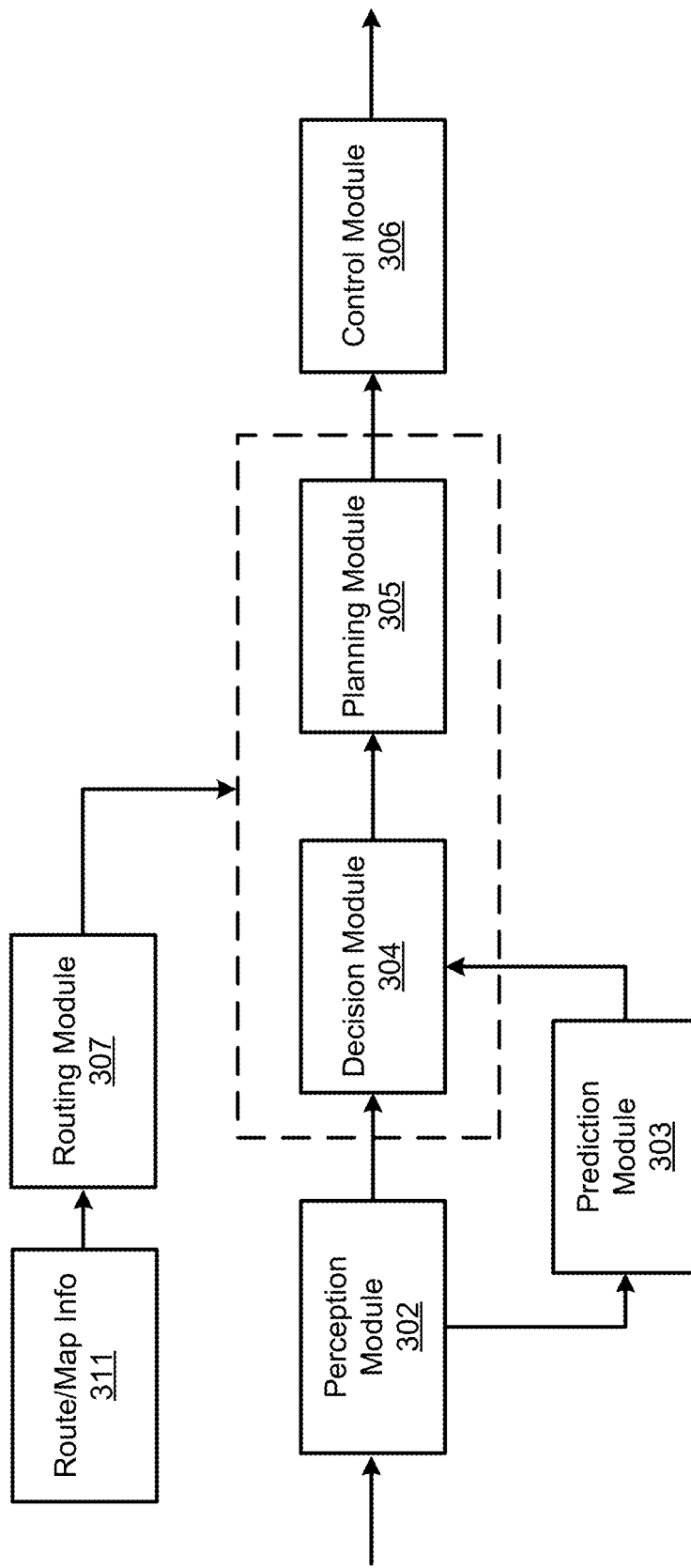

FIGS. 3A and 3B are block diagrams illustrating an example of a perception and planning system used with an autonomous vehicle according to one embodiment. System 300 may be implemented as a part of autonomous vehicle 101 of FIG. 1 including, but is not limited to, perception and planning system 110, control system 111, and sensor system 115. Referring to FIGS. 3A-3B, perception and planning system 110 includes, but is not limited to, localization module 301, perception module 302, prediction module 303, decision module 304, planning module 305, control module 306, routing module 307, and security module 308.

Some or all of modules 301-308 may be implemented in software, hardware, or a combination thereof. For example, these modules may be installed in persistent storage device 352, loaded into memory 351, and executed by one or more processors (not shown). Note that some or all of these modules may be communicatively coupled to or integrated with some or all modules of vehicle control system 111 of FIG. 2. Some of modules 301-308 may be integrated together as an integrated module. For example, decision module 304 and planning module 305 may be integrated as a single module.

Localization module 301 determines a current location of autonomous vehicle 300 (e.g., leveraging GPS unit 212) and manages any data related to a trip or route of a user. Localization module 301 (also referred to as a map and route module) manages any data related to a trip or route of a user. A user may log in and specify a starting location and a destination of a trip, for example, via a user interface. Localization module 301 communicates with other components of autonomous vehicle 300, such as map and route information 311, to obtain the trip related data. For example, localization module 301 may obtain location and route information from a location server and a map and POI (MPOI) server. A location server provides location services and an MPOI server provides map services and the POIs of certain locations, which may be cached as part of map and route information 311. In one embodiment, the map and route information 311 may be HD maps constructed from raw point cloud data based on point cloud registration that estimates the sensor's GPS positions and poses during collection of the raw point cloud data. The HD maps may be downloaded from the location server and the MPOI server. While autonomous vehicle 300 is moving along the route, localization module 301 may also obtain real-time traffic information from a traffic information system or server.

Based on the sensor data provided by sensor system 115 and localization information obtained by localization module 301, a perception of the surrounding environment is determined by perception module 302. The perception information may represent what an ordinary driver would perceive surrounding a vehicle in which the driver is driving. The perception can include the lane configuration, traffic light signals, a relative position of another vehicle, a pedestrian, a building, crosswalk, or other traffic related signs (e.g., stop signs, yield signs), etc., for example, in a form of an object. The lane configuration includes information describing a lane or lanes, such as, for example, a shape of the lane (e.g., straight or curvature), a width of the lane, how many lanes in a road, one-way or two-way lane, merging or splitting lanes, exiting lane, etc.

Perception module 302 may include a computer vision system or functionalities of a computer vision system to process and analyze images captured by one or more cameras in order to identify objects and/or features in the environment of autonomous vehicle. The objects can include traffic signals, road way boundaries, other vehicles, pedestrians, and/or obstacles, etc. The computer vision system may use an object recognition algorithm, video tracking, and other computer vision techniques. In some embodiments, the computer vision system can map an environment, track objects, and estimate the speed of objects, etc. Perception module 302 can also detect objects based on other sensors data provided by other sensors such as a radar and/or LIDAR.

For each of the objects, prediction module 303 predicts what the object will behave under the circumstances. The prediction is performed based on the perception data perceiving the driving environment at the point in time in view of a set of map/rout information 311 and traffic rules 312. For example, if the object is a vehicle at an opposing direction and the current driving environment includes an intersection, prediction module 303 will predict whether the vehicle will likely move straight forward or make a turn. If the perception data indicates that the intersection has no traffic light, prediction module 303 may predict that the vehicle may have to fully stop prior to enter the intersection. If the perception data indicates that the vehicle is currently at a left-turn only lane or a right-turn only lane, prediction module 303 may predict that the vehicle will more likely make a left turn or right turn respectively.

For each of the objects, decision module 304 makes a decision regarding how to handle the object. For example, for a particular object (e.g., another vehicle in a crossing route) as well as its metadata describing the object (e.g., a speed, direction, turning angle), decision module 304 decides how to encounter the object (e.g., overtake, yield, stop, pass). Decision module 304 may make such decisions according to a set of rules such as traffic rules or driving rules 312, which may be stored in persistent storage device 352.

Routing module 307 is configured to provide one or more routes or paths from a starting point to a destination point. For a given trip from a start location to a destination location, for example, received from a user, routing module 307 obtains route and map information 311 and determines all possible routes or paths from the starting location to reach the destination location. Routing module 307 may generate a reference line in a form of a topographic map for each of the routes it determines from the starting location to reach the destination location. A reference line refers to an ideal route or path without any interference from others such as other vehicles, obstacles, or traffic condition. That is, if there is no other vehicle, pedestrians, or obstacles on the road, an ADV should exactly or closely follows the reference line. The topographic maps are then provided to decision module 304 and/or planning module 305. Decision module 304 and/or planning module 305 examine all of the possible routes to select and modify one of the most optimal routes in view of other data provided by other modules such as traffic conditions from localization module 301, driving environment perceived by perception module 302, and traffic condition predicted by prediction module 303. The actual path or route for controlling the ADV may be close to or different from the reference line provided by routing module 307 dependent upon the specific driving environment at the point in time.

Based on a decision for each of the objects perceived, planning module 305 plans a path or route for the autonomous vehicle, as well as driving parameters (e.g., distance, speed, and/or turning angle), using a reference line provided by routing module 307 as a basis. That is, for a given object, decision module 304 decides what to do with the object, while planning module 305 determines how to do it. For example, for a given object, decision module 304 may decide to pass the object, while planning module 305 may determine whether to pass on the left side or right side of the object. Planning and control data is generated by planning module 305 including information describing how vehicle 300 would move in a next moving cycle (e.g., next route/path segment). For example, the planning and control data may instruct vehicle 300 to move 10 meters at a speed of 30 miles per hour (mph), then change to a right lane at the speed of 25 mph.

Based on the planning and control data, control module 306 controls and drives the autonomous vehicle, by sending proper commands or signals to vehicle control system 111, according to a route or path defined by the planning and control data. The planning and control data include sufficient information to drive the vehicle from a first point to a second point of a route or path using appropriate vehicle settings or driving parameters (e.g., throttle, braking, steering commands) at different points in time along the path or route.

In one embodiment, the planning phase is performed in a number of planning cycles, also referred to as driving cycles, such as, for example, in every time interval of 100 milliseconds (ms). For each of the planning cycles or driving cycles, one or more control commands will be issued based on the planning and control data. That is, for every 100 ms, planning module 305 plans a next route segment or path segment, for example, including a target position and the time required for the ADV to reach the target position. Alternatively, planning module 305 may further specify the specific speed, direction, and/or steering angle, etc. In one embodiment, planning module 305 plans a route segment or path segment for the next predetermined period of time such as 5 seconds. For each planning cycle, planning module 305 plans a target position for the current cycle (e.g., next 5 seconds) based on a target position planned in a previous cycle. Control module 306 then generates one or more control commands (e.g., throttle, brake, steering control commands) based on the planning and control data of the current cycle.

Note that decision module 304 and planning module 305 may be integrated as an integrated module. Decision module 304/planning module 305 may include a navigation system or functionalities of a navigation system to determine a driving path for the autonomous vehicle. For example, the navigation system may determine a series of speeds and directional headings to affect movement of the autonomous vehicle along a path that substantially avoids perceived obstacles while generally advancing the autonomous vehicle along a roadway-based path leading to an ultimate destination. The destination may be set according to user inputs via user interface system 113. The navigation system may update the driving path dynamically while the autonomous vehicle is in operation. The navigation system can incorporate data from a GPS system and one or more maps so as to determine the driving path for the autonomous vehicle.

Decision module 304/planning module 305 may further include a collision avoidance system or functionalities of a collision avoidance system to identify, evaluate, and avoid or otherwise negotiate potential obstacles in the environment of the autonomous vehicle. For example, the collision avoidance system may effect changes in the navigation of the autonomous vehicle by operating one or more subsystems in control system 111 to undertake swerving maneuvers, turning maneuvers, braking maneuvers, etc. The collision avoidance system may automatically determine feasible obstacle avoidance maneuvers on the basis of surrounding traffic patterns, road conditions, etc. The collision avoidance system may be configured such that a swerving maneuver is not undertaken when other sensor systems detect vehicles, construction barriers, etc. in the region adjacent the autonomous vehicle that would be swerved into. The collision avoidance system may automatically select the maneuver that is both available and maximizes safety of occupants of the autonomous vehicle. The collision avoidance system may select an avoidance maneuver predicted to cause the least amount of acceleration in a passenger cabin of the autonomous vehicle.

In one embodiment, security module 308 is configured to detect cyber and spoof attacks based on a set of security rules 313. Security module 308 may be implemented as a part of perception module 302 or may communicate with perception module 302 or other modules. Security module 308 may detect changes to the autonomous vehicle's destination or abnormal re-routing activities to determine if there is a cyber-attack. Security module 308 may also detect spoofing on the autonomous vehicle's sensor system 115 to foil spoofing attacks. In one embodiment, security module 308 may inform the decision module 304 of the attacks so the autonomous vehicle may be switched to a fail-safe operation.

Note that some or all of the components as shown and described above may be implemented in software, hardware, or a combination thereof. For example, such components can be implemented as software installed and stored in a persistent storage device, which can be loaded and executed in a memory by a processor (not shown) to carry out the processes or operations described throughout this application. Alternatively, such components can be implemented as executable code programmed or embedded into dedicated hardware such as an integrated circuit (e.g., an application specific IC or ASIC), a digital signal processor (DSP), or a field programmable gate array (FPGA), which can be accessed via a corresponding driver and/or operating system from an application. Furthermore, such components can be implemented as specific hardware logic in a processor or processor core as part of an instruction set accessible by a software component via one or more specific instructions.

Figure 4:
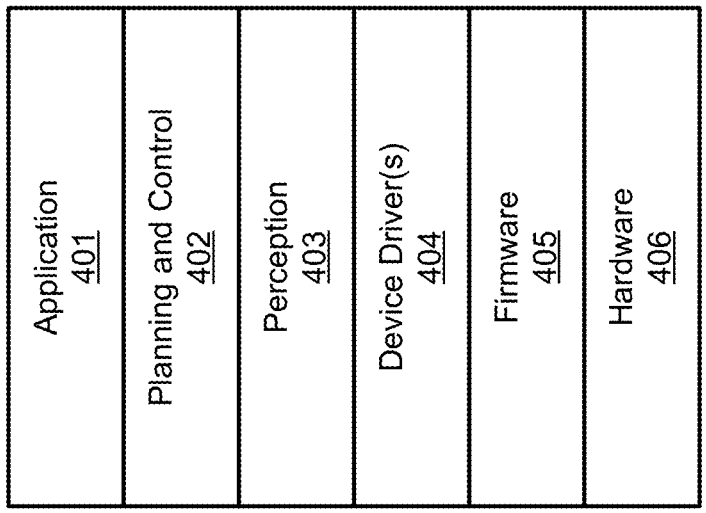
FIG. 4 is a block diagram illustrating architecture of an autonomous driving system according to one embodiment.

FIG. 4 is a block diagram illustrating system architecture for autonomous driving according to one embodiment. System architecture 400 may represent system architecture of an autonomous driving system as shown in FIGS. 3A and 3B. Referring to FIG. 4, system architecture 400 includes, but it is not limited to, application layer 401, planning and control (PNC) layer 402, perception layer 403, driver layer 404, firmware layer 405, and hardware layer 406. Application layer 401 may include user interface or configuration application that interacts with users or passengers of an autonomous driving vehicle, such as, for example, functionalities associated with user interface system 113. PNC layer 402 may include functionalities of at least planning module 305 and control module 306. Perception layer 403 may include functionalities of at least perception module 302. In one embodiment, there is an additional layer including the functionalities of prediction module 303 and/or decision module 304. Alternatively, such functionalities may be included in PNC layer 402 and/or perception layer 403. Firmware layer 405 may represent at least the functionality of sensor system 115, which may be implemented in a form of a field programmable gate array (FPGA). Hardware layer 406 may represent the hardware of the autonomous driving vehicle such as control system 111. Layers 401-403 can communicate with firmware layer 405 and hardware layer 406 via device driver layer 404.

Figure 5:
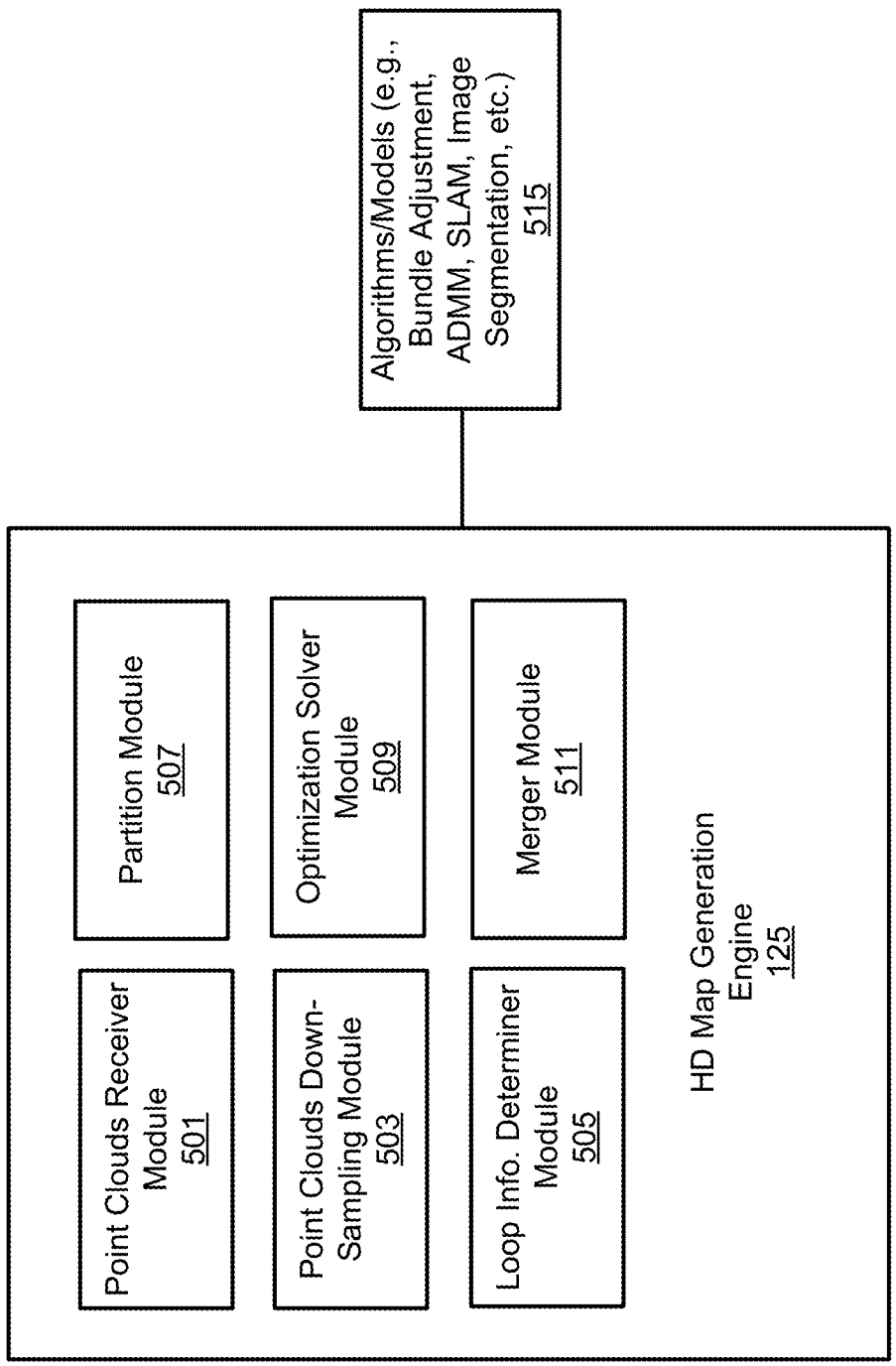
FIG. 5 is a block diagram illustrating an example of an HD map generation engine according to one embodiment.

FIG. 5 is a block diagram illustrating an example of a HD map generation engine 125 according to one embodiment. HD map generation engine can register point clouds and generate an HD map based on the point cloud registration. Referring to FIG. 5, HD map generation engine 125 can include a number of modules such as point clouds receiver module 501, point clouds down-sampling module 503, loop information determiner module 505, partition module 507, optimization solver module 509, and merger module 511.

Note that some or all of these modules can be integrated into fewer modules or partitioned into more modules.

Point clouds receiver module 501 can receive point clouds (e.g., LIDAR images captured by LIDAR sensors of an ADV) and corresponding poses (e.g., position and orientation). A point cloud refers to a set of data points, in this example, captured by a LIDAR device at a particular point in time. Each data point is associated with location information of the data point (e.g., x, y, and z coordinates). Point clouds down-sampling module 503, which may be optional, may down-sample the point clouds spatially or temporally. Loop information determiner module 505 can determine whether there is a loop closure for a set of point clouds corresponding to a navigable area that forms a geographic loop. Partition module 507 can partition one or more navigable areas into one or more partitions based on the closure information or block partition information. Optimization solver module 509 can apply an optimization algorithm (such as a bundle adjustment algorithm based on regional ICP, ADMM algorithm, SLAM algorithm, image segmentation algorithms, etc., as part of algorithms 515 of FIG. 4 or algorithms 124 of FIG. 1) to point clouds and poses corresponding to a partition to generate refined HD LIDAR poses for the point cloud registration. Point cloud registration refers to alignment of point clouds data for an area to be mapped. Merger module 511 can merge a number of partitions together for HD map generation.

Figure 6:
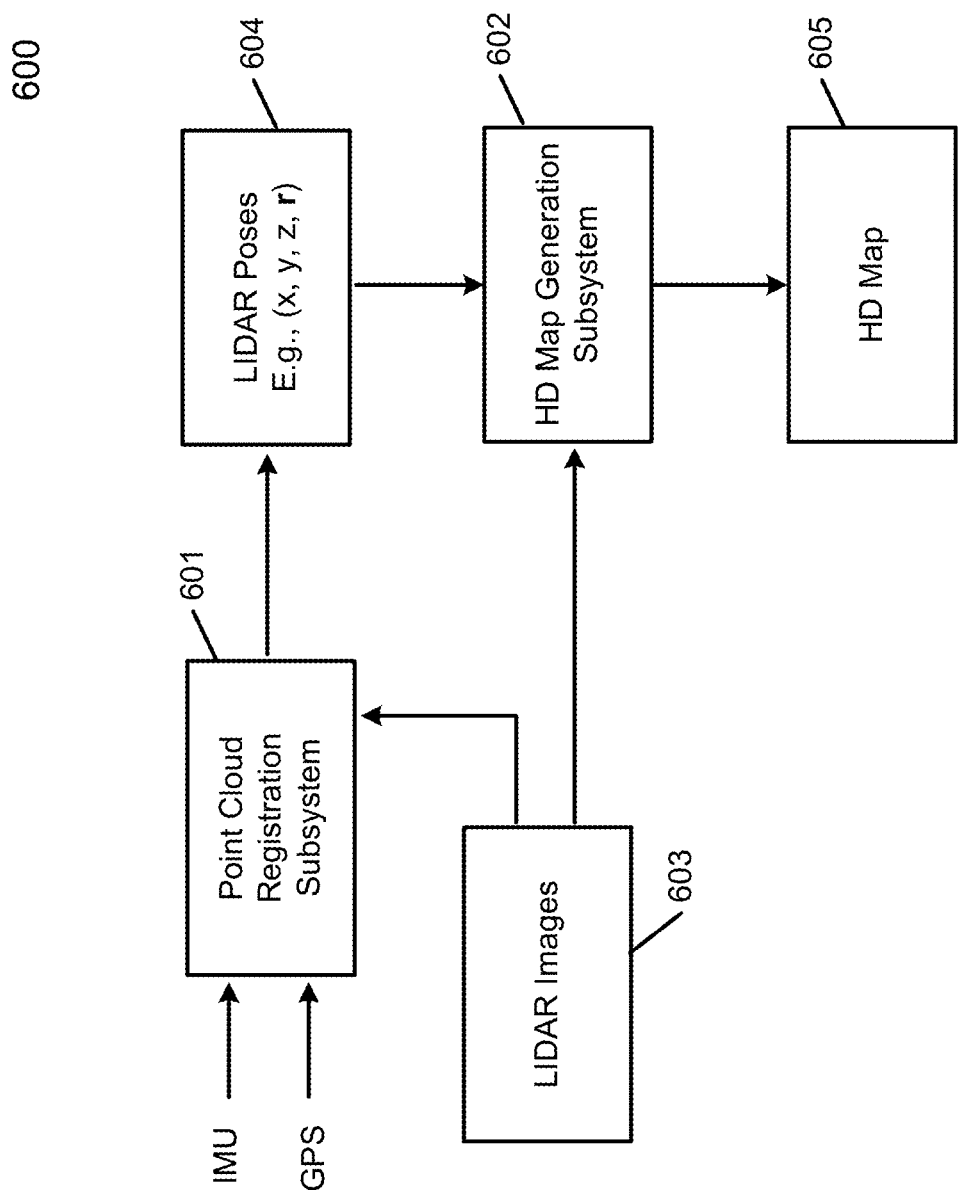
FIG. 6 is a block diagram illustrating an example of an HD map generation system according to one embodiment.

FIG. 6 is a block diagram illustrating an example of an HD map generation system according to one embodiment. HD map generation system 500 may be part of HD map generation engine 125 of FIG. 1. Referring to FIG. 6, in one embodiment, HD map generation system 600 includes point cloud registration subsystem 601 and HD map generation subsystem 602. Point cloud registration subsystem 601 can receive an IMU signal, a GPS signal, and LIDAR images 603 (e.g., from IMU 213, GPS unit 212, and LIDAR unit 215 respectively) as inputs and generates HD poses 604 (or aligns the poses for the LIDAR images 603) based on the received inputs. HD map generation subsystem 602 can then receive LIDAR images 603 and HD poses 604 as inputs and generate HD map 605 based on the inputs.

Figure 7:
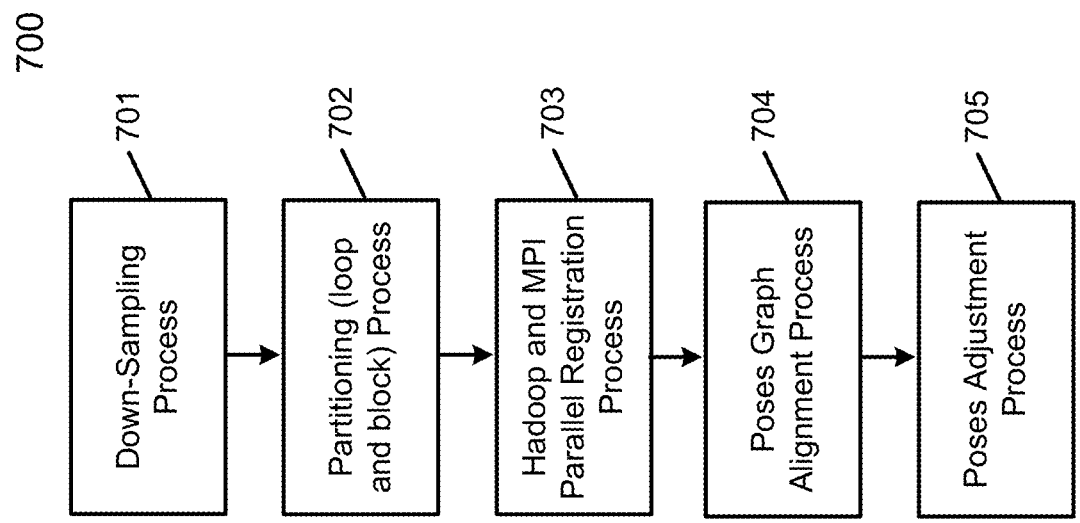
FIG. 7 is a block diagram illustrating an example of processing of point cloud data for an HD map generation system according to one embodiment.

FIG. 7 is a block diagram illustrating an example of processing of point cloud data for a HD map generation system according to one embodiment. Point cloud data processing flow 700 may be implemented by a HD map generation system such as system 600 of FIG. 6 or HD map generation engine such as engine 125 of FIG. 5. Referring to FIG. 7, in one embodiment, point cloud data processing flow 700 includes, but is not limited to, down-sampling process 701, partitioning process 702, Hadoop and Message Passing Interface (MPI) parallel registration process 703, poses graph alignment process 704, and poses adjustment process 705. Some of these operations 701-705 may be performed by different processing nodes in series, parallel, or in a pipeline manner, which may be distributed by a map generation system. The different processes are described as follow:

The input to point cloud data processing flow 700 may be raw point clouds and their poses collected from task scenarios from LIDAR sensors mounted on one or more ADVs. Usually the input contains tens or hundreds of thousands of LIDAR poses to be optimized and aligned. In order to minimize a number of input points, down-sampling process 701 may down sample the poses both spatially and/or temporally in a sequential manner.

In one embodiment, down-sampling process 701 may down-sample point clouds spatially. For example, down-sampling process 701 may determine a spatial sliding window. The sliding window may be a circular window with a predetermined radius. Down-sampling process 701 then identifies one LIDAR point cloud and a corresponding pose for all point clouds inside the spatial window for further processing. In one embodiment, the one LIDAR point cloud may be identified based on a spatial region of interest, e.g., a central region of the sliding window.

In another embodiment, down-sampling process 601 may down-sample point clouds temporally. For example, down-sampling process 601 may determine a temporal sliding window to track a time sequence (e.g., using timestamps) of LIDAR point clouds for each spatial sliding window. Down-sampling process 601 may then identify one LIDAR point cloud and its corresponding pose for further processing based on each time sequence. For example, if there are two time sequences, i.e. two time clusters, down-sampling process 701 may down-sample to a point cloud and a corresponding pose for the two time sequences. Down-sampling the point cloud temporally is especially useful for scenarios when an ADV is idle at a red stop light. In this case, the idle ADV can capture a time sequence of substantially identical LIDAR frames but only one LIDAR point cloud is useful. Thus down-sampling identifies one LIDAR point cloud for further processing for the time sequence instead of the multiple LIDAR point clouds of the time sequence capturing the similar point clouds for the red stop light. Thus, down-sampling would decrease a number of repetitive or similar point cloud data and optimizes the input data for the point cloud processing. The down-sampled point clouds are then partitioned by process 702.

In one embodiment, partitioning process 702 determines loop closure information based on one or more computer vision algorithms such as edge detection and/or image segmentation algorithms. For example, partitioning process 702 may detect features or image edges using a corner detection algorithm. A corner detection algorithm, such as a Harris corner detector, may extract and infer features from a LIDAR image (e.g., a point cloud). Partitioning process 702 may then detect and track one or more loops based on a combination of corresponding poses, detected features, and/or a collection of time and velocity information of the vehicle which can predict a location of the vehicle. In another embodiment, road loop closures may be identified based on road contours or features of road contours. Partitioning process 602 then partitions the point clouds into one or more sets of point clouds based on the loop closure information such that one set of point clouds corresponds to a loop.

In one embodiment, if a detected loop spans an area greater than a predetermined threshold, partition process 702 may apply a spatial partitioning to the loop partition and may further divide the loop partition into two or more blocks partition. This way, a computation load of each partition would not exceed a predetermined threshold. In one embodiment, loops are partitioned into blocks of a predetermined spatial area. The partitioned point clouds may then be registered in parallel by a node cluster of computational nodes in Hadoop and Message Passing Interface (MPI) process 703.

Point cloud registration refers to aligning various point clouds to a reference pose or point cloud. For each loop or block partition, to align the point clouds in the partition, the point clouds corresponding to the partition is applied an optimization algorithm to generate HD LIDAR poses for the point clouds. For example, process 703 may apply an iterative closest point (ICP) algorithm to a set of point clouds. Note, ICP is an algorithm employed to minimize the difference between two clouds of points. ICP is often used to reconstruct 2D or 3D surfaces from different scans. For ICP, one point cloud, e.g., a reference, is kept fixed, while the others are transformed to best match the reference. The algorithm iteratively revises a transformation (e.g., translation and rotation) required to minimize an error metric, e.g., a sum of squared differences between the coordinates of the matched pairs, or a distance from the other point clouds to the reference point cloud.

For example, for point cloud i with a corresponding LIDAR pose, the LIDAR pose (x, y, z, (yaw, pitch, and roll)) corresponding to a transformation matrix (e.g., $\mathcal{R}_i = (t_i, R_i)$, where $t_i$ is a translation and $R_i$ is a rotation transformation) can be used to project point cloud i from a relative coordinate system (relative to a vehicle) to a Universal Transverse Mercator (UTM) coordinate system. The projection equation is then: $f_{\mathcal{R}_i}(x_k) = R_i x_k + t_i$, where $x_k$ is any point from the set of point cloud i, $t_i$ is a translation, and $R_i$ is a rotation transformation.

For each partition, process 703 can identify related point cloud pairs (or frame pairs) based on point clouds' poses as $\mathfrak{F}$, where the pair $\mathfrak{S}_{(i,j)} \in \mathfrak{F}$ a represents the pair of point cloud i and point cloud j. Then the points between pair of point clouds can be defined as: $(x_k, x_l) \in \mathfrak{P}_{(i,j)}$, where $x_k$ is a point from LIDAR point cloud index i, $x_l$ is a point from LIDAR point cloud index j, where $\mathfrak{P}_{(i,j)}$ represents the pair of points from the pair of point cloud pairs with index i and j. The point pair $\mathfrak{P}_{(i,j)}$ is measured by each point cloud's input position, which is usually from, but not limited to, GPS signals. A bundle adjustment (BA) equation of the ICP algorithm based on the above, to be optimized, is then as follow:

$$min_{\mathcal{R}_i \in P} \Sigma_{\mathfrak{S}_{(i,j)} \in \mathfrak{F}} \Sigma_{(x_k, x_l) \in \mathfrak{P}_{(i,j)}} \|(( f_{\mathcal{R}_i(x_k)} - f_{\mathcal{R}_j(x_l)}) \cdot \vec{n_i}\|(P) \quad \text{[Equation 1]}$$

where $\vec{n_i}$ is the norm vector at point $x_k$.

The above equation (P) may be solved by an optimization algorithm such as Levenberg Marquardt (LM) algorithm, however, its complexity is around $O(m^3)$ where m is the number of frame pairs. LM algorithm is used to solve non-linear least squares curve-fitting problems by finding a local minimum. In one embodiment, equation (P) may be subdivided into one or more subproblems and these subproblems can be applied an optimization algorithm (such as ADMM algorithm) to be solved separately. In one embodiment, these subproblems are solved in parallel using the computational nodes of a node cluster. For example, for a given frame pair $\mathfrak{F}_m \subseteq \mathfrak{F}$, the pose transformation matrix for the i-th point cloud for the m-th frame pair is $\mathcal{R}_i^m$, where the upper-subscript represents the index of subset of frame pair m and the lower-subscript represents the index of point cloud i in the set of point cloud P. Then the bundle adjustment equations based on the parallel pipeline, to be optimized, is then as follow:

$$min_{\mathcal{R}_i \in P} \Sigma_{\mathfrak{S}_{(i,j)} \in \mathfrak{F}_i} \Sigma_{(x_k, x_l) \in \mathfrak{P}_{(i,j)}} \|(( f_{\mathcal{R}_i^m(x_k)} - f_{\mathcal{R}_i^m(x_j)}) \cdot \vec{n_i}\|(P_m), \quad \text{[Equation 2]}$$

where $\mathcal{R}_i^m = \mathcal{R}_i$, $\forall \mathfrak{F}_i \subseteq \mathfrak{F}$, and $\forall \mathcal{R}_i \in P$.

In this example, the optimization algorithm can be processed by one or more nodes of a node cluster, e.g., each node processes a frame pair. In one embodiment, whether frame pairs are related can be determined based on a timestamp corresponding to the pair of frames, e.g., frame pairs which have consecutive timestamps or are within a time threshold can be related frame pairs. In another embodiment, related frame pairs can be determined based on loop closure information. For example, two frames which have separate timestamps but coincide with a same or similar location can be related frames (e.g., loop closures). In this case, the point clouds for the two frames should be substantially similar or matching. Once the poses are aligned or registered for each partition, the partitions can be merged together by process 704.

In one embodiment, poses graph alignment process 704 may merge the individual partitions into a larger map partition based on a pose graph alignment algorithm, such as a simultaneous localization and mapping (SLAM) algorithm. In one embodiment, overlapping areas for side-by-side partitions are coupled together such that only one set of output is necessary for the overlapping area, e.g., only one set of overlapping routes is necessary if the overlapping area is a route common to both areas.

In one embodiment, poses adjustment process 705 may further refine or adjust the poses to a UTM coordinate system. For example, previously, one pose is assumed as a reference pose to align other poses and point clouds. Process 705 can apply a final pose adjustment to decrease an overall error for mapping to the UTM coordinate system. For example, process 705 may analyze the input LIDAR poses for GPS confidence levels by comparing corresponding poses before and after optimization algorithm is applied. A pose (or poses) identified with the most confidence, e.g., a change between the received pose and the calculated HD pose is below a threshold, are kept for pose adjustment. All the poses are then applied a rigid body transform based on the identified pose. A rigid body transformation is a transformation which preserves a shape and size of the object to be transformed. Here, a rotational or a reflectional transformation is a rigid body transformation, while scaling is not a rigid body transformation. Finally, the point clouds with the adjusted poses are used to generate a high definition (HD) 3D point clouds map. In one embodiment, the 3D point clouds map can be transformed into a 2D localization map with a top-down view.

As mentioned, to reduce computational complexity, point cloud registration of frame pairs of a map may be divided into smaller partitions or sub-maps. Each partition or sub-map may contain a smaller number of frame pairs. Point cloud registration for the partitions or sub-maps may be implemented in parallel running regional ICP algorithms on computational nodes of a node cluster. To reduce the dependencies of the regional ICP algorithms, such as the accuracy of the alignment of the point clouds of the frame pairs and the resulting accuracy of the constructed map, on the memory resources of the computation nodes, a method to partition the map or the sub-maps for the regional ICP algorithms is disclosed.

Figure 8:
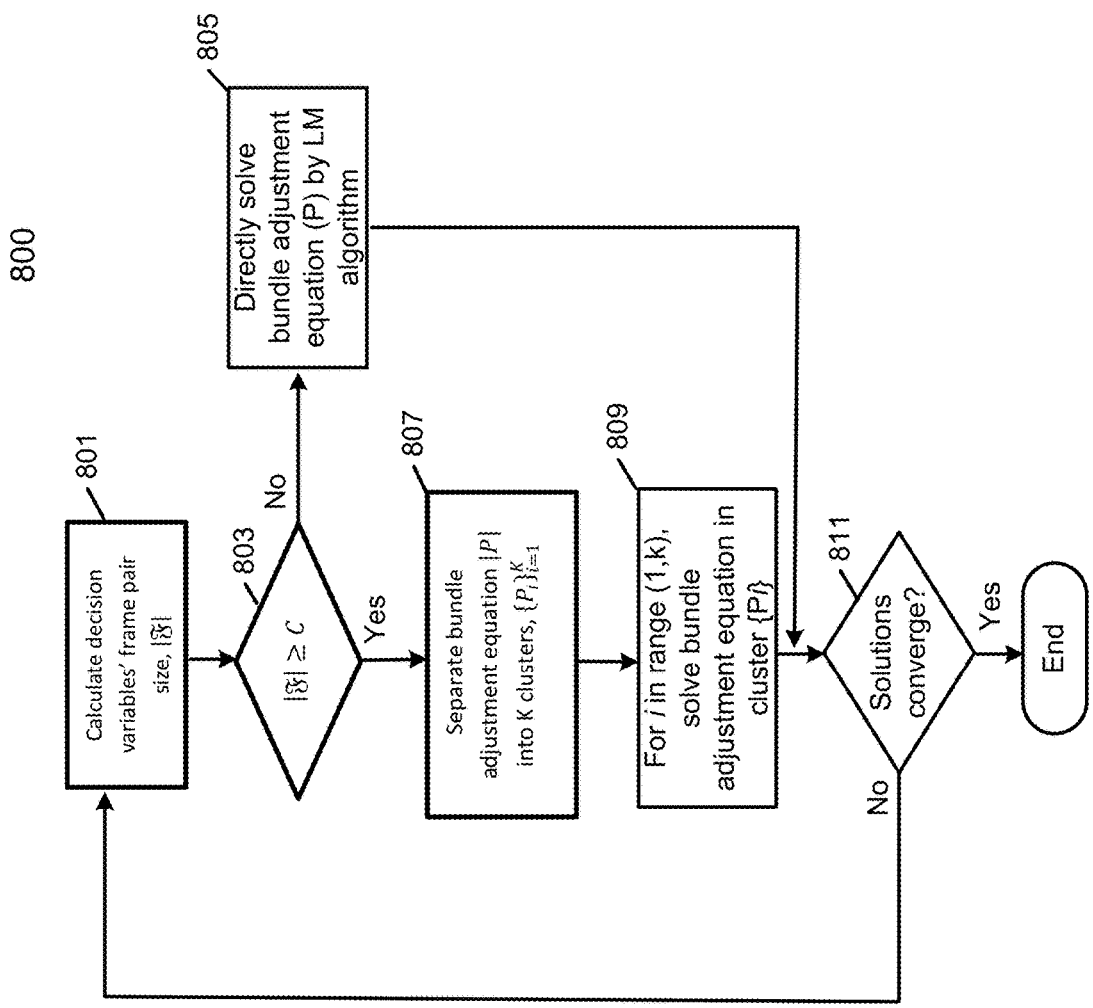
FIG. 8 is a flow diagram illustrating an example of a method for separating a bundle adjustment equation into K clusters as a function of the frame pair size according to one embodiment.

FIG. 8 is a flow diagram illustrating an example of a method for separating a bundle adjustment equation into K clusters as a function of the frame pair size according to one embodiment. Method 800 may be performed by processing logic which may include software, hardware, or a combination thereof. For example, method 800 may be performed by a map generation engine of an autonomous vehicle, such as HD map generation engine 125 of server 103.

At operation 801, the method 800 may determine the frame pair size of decision variables, such as the frame pair size of one or more pairs of related LIDAR poses of a region of an HD map to be constructed. In one embodiment, the frame pair size may be the geometric distance between the pair of LIDAR poses. The region containing the frame pair may be a sub-map or a partition of the HD map, or may be an entirety of the HD map.

At operation 803, the method 800 compares the frame pair size of the frame pairs with a threshold. In one embodiment, the threshold may be a function of the size of the memory of the computational nodes. In one embodiment, the memory size of a computational node may be less than 128 Gb. If the frame pair size of the frame pairs is less than the threshold, at operation 805, the method 800 directly implements the ICP algorithms by solving the bundle adjustment equation of the region, such as the bundle adjustment equation (P) of Equation 1, using the LM algorithm.

If the frame pair size is greater than or equal to the threshold, at operation 807, the method 800 divides the region or the number of frame pairs into K clusters. In one embodiment, the method 800 may separate the bundle adjustment equation (P) of equation 1 into K sub-problems, $(P_i)_{i=1}^K$. In one embodiment, inside each cluster, the frame pair size of the frame pairs is less than the threshold.

At operation 809, the method 800 separately solves the bundle adjustment equations, the K sub-problems, $(P_i)_{i=1}^K$, for the K clusters. The bundle adjustment equations $(P_i)_{i=1}^K$ to be optimized for the K clusters, are then:

$$min_{\mathcal{R}_i \in P_i} \Sigma_{\mathfrak{S}_{(i,j)} \in \mathfrak{F}_i} \Sigma_{(x_k,x_l) \in \mathfrak{P}(i,j)} \|(f_{\mathcal{R}_i(x_k)} - f_{\mathcal{R}_j(x_l)}) \cdot \vec{n}_l)\|(P_i)$$ [Equation 3]

where $P_i$ is one of the K clusters, the frame pair subset $\mathfrak{F}_i$ is defined for $\mathfrak{S}_{(i,j)} \in \mathfrak{F}_i$, $\mathcal{R}_i \in P_i$ or $\mathcal{R}_j \in P_i$. Thus, the size of $\mathfrak{F}_i$ is smaller than $\mathfrak{F}$.

In one embodiment, inside a cluster, the ICP algorithm focuses on a partial subset of the decision variables and assumes the rest of the decision variables are fixed. For example, if one LIDAR pose of the frame pair $\mathfrak{F}_i$, such as $\mathcal{R}_i$, is inside the cluster and the other LIDAR pose of the frame pair $\mathfrak{F}_i$, such as $\mathcal{R}_j$, is outside the cluster, the method regards the LIDAR pose $\mathcal{R}_1$ outside of the cluster as a constant when implementing the ICP algorithm by solving the bundle adjustment $(P_i)$ equation using the LM algorithm. The method 800 separately solves the bundle adjustment $(P_i)$ equation for each cluster and separately updates the solution for each cluster. The effect is that the convergence of the solution descends the gradient along a certain direction in the solution space instead of being allowed to descend in all directions. This method, referred to as the coordinate gradient method, reduces the number of optimized variables each time the gradient is calculated, and reduces the memory resources of the computation nodes of the computing clusters. The result is an increase in the density of the point clouds and an increase in the resolution of the 3D HD map.

At operation 811, the method 800 determines if the solutions of the bundle adjustment equations for the clusters converge. If the solutions converge, a solution to the point cloud registration for the region is found. Otherwise, if the solution does not converge, the method 800 may return to operation 801 to iteratively recalculate the frame pair size of different pairs of LIDAR poses using the solutions from the current iteration, use a different metric to calculate the frame pair size of the decision variables, or change the threshold. In one embodiment, the threshold may be a tradeoff between the memory resource of the computational nodes and the efficiency of the method. For example, a smaller threshold may generate a greater number of clusters, reducing the amount of memory in the computational node but due to the smaller solution space of each cluster, there may be stitching effect and reduced efficiency during the convergence of the solution.

Figure 9:
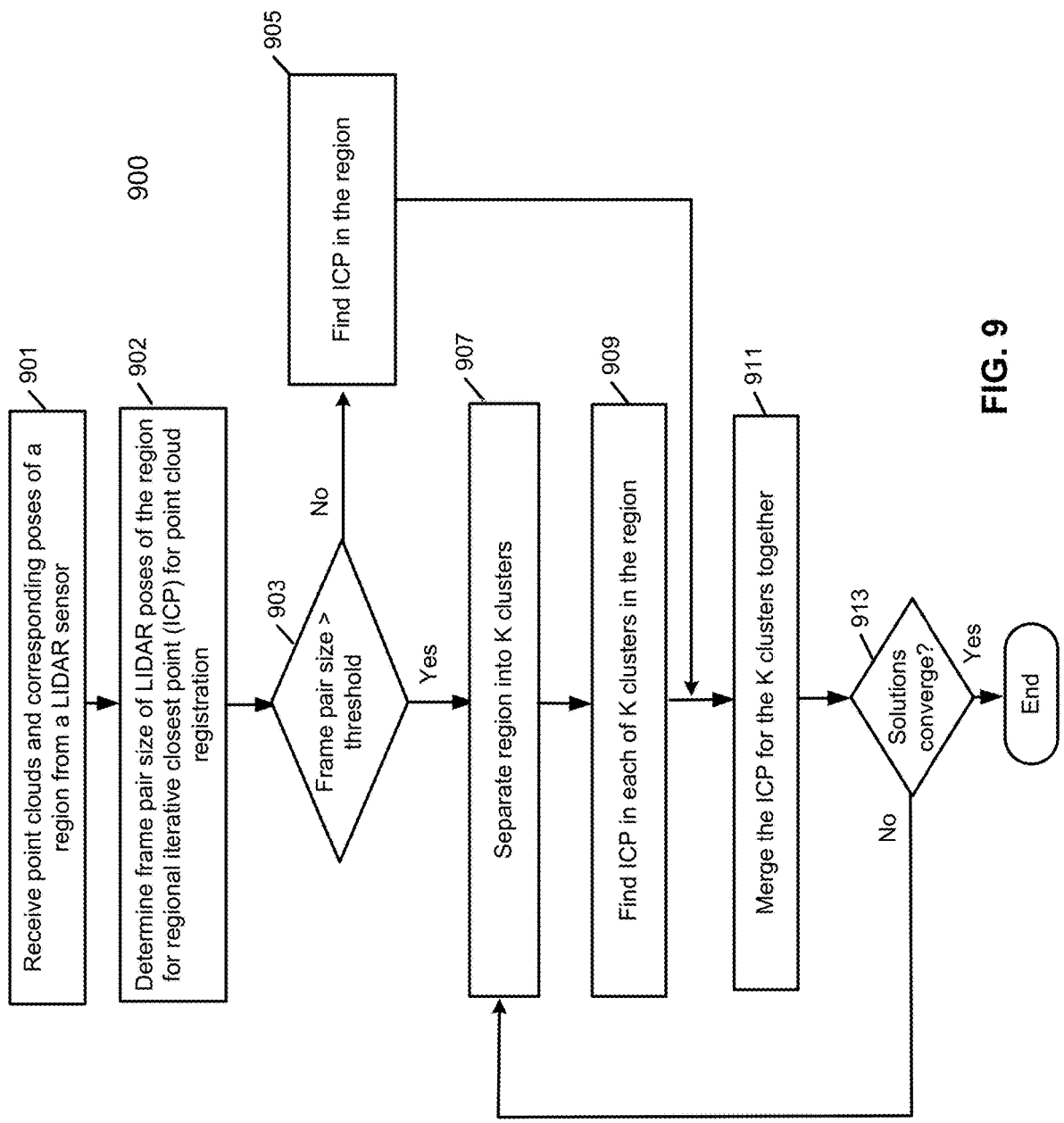
FIG. 9 is a flow chart illustrating an example of a method for separating a region for ICP into K clusters as a function of the frame pair size according to one embodiment.

FIG. 9 is a flow chart illustrating an example of a coordinate gradient method for separating a region for ICP into K clusters as a function of the frame pair size and separately solving the ICP for each cluster according to one embodiment. Method 900 may be performed by processing logic which may include software, hardware, or a combination thereof. For example, method 900 may be performed by a map generation engine of an autonomous vehicle, such as HD map generation engine 125 of server 103.

At operation 901, the method 900 receives point clouds and corresponding poses of a region from a LIDAR sensor of an ADV. The LIDAR poses may be the positions and orientations of LIDAR sensors of an ADV when the corresponding point clouds of the region are captured by the LIDAR sensor.

At operation 902, the method 900 determines the frame pair size of one or more pairs of related LIDAR poses of the region for a regional ICP for point cloud registration. In one embodiment, the frame pair size may be the geometric distance between a pair of LIDAR poses.

At operation 903, the method 900 compares the frame pair size of the one or more frame pairs against a threshold. At operation 905, if the frame pair size is smaller than the threshold, the method 900 implements the ICP algorithm in the region. In one embodiment, the ICP algorithm solves the bundle adjustment equation of the region, such as the bundle adjustment equation (P) of Equation 1, using the LM algorithm to register the point clouds in the region. Otherwise, if the frame pair size is greater or equal to the threshold, the method 900 separates the region into K clusters at operation 907. In one embodiment, inside each cluster, the frame pair size of the frame pairs is less than the threshold.

At operation 909, the method 900 implements the ICP algorithm in each of the K clusters of the region. In one embodiment, the method 900 separately solves the bundle adjustment equations for the K clusters, such as the bundle adjustment equations $(P_i)$ of Equation 3, using the LM algorithm to register the point clouds in the K clusters. The method 900 separately updates the solutions of the ICP algorithm in each of the K clusters.

At operation 911, the method 900 merges the solutions of the ICP algorithms for the K clusters of the region. In one embodiment, the method may check if the merged solutions converge at operation 913. For example, the solutions may be determined not to converge if the translation change of a point cloud between the initial value and the solution is too large. If the solutions do not converge, the solutions from the K clusters may be iteratively re-evaluated by operation 907 to be separated into a different cluster for running the ICP algorithm in each cluster in operation 909. In one embodiment, operations 907 and 909 may iteratively run until either a maxim number of iterations is exceeded or until the solutions converge. In one embodiment, the method 900 uses a pose graph algorithm to merge the results from the K clusters. The merged results merge the point clouds that are utilized to perceive a driving environment surround the ADV.

A data processing system may perform any of the processes or methods described above, such as, for example, the cyber-attack or the spoofing detection method. The data processing system can include many different components. These components can be implemented as integrated circuits (ICs), portions thereof, discrete electronic devices, or other modules adapted to a circuit board such as a motherboard or add-in card of the computer system, or as components otherwise incorporated within a chassis of the computer system.

The data processing system may include one or more processors, one or more memories, and devices connected via a bus. Processors may represent one or more general-purpose processors such as a microprocessor, a central processing unit (CPU), or the like. More particularly, processors may be a complex instruction set computing (CISC) microprocessor, reduced instruction set computing (RISC) microprocessor, very long instruction word (VLIW) microprocessor, or processor implementing other instruction sets, or processors implementing a combination of instruction sets. Processors may also be one or more special-purpose processors such as an application specific integrated circuit (ASIC), a cellular or baseband processor, a field programmable gate array (FPGA), a digital signal processor (DSP), a network processor, a graphics processor, a communications processor, a cryptographic processor, a co-processor, an embedded processor, or any other type of logic capable of processing instructions. Processors may be configured to execute instructions stored in the memories for performing the operations and steps discussed herein.

Processing module/unit/logic, components and other features described herein can be implemented as discrete hardware components or integrated in the functionality of hardware components such as ASICS, FPGAs, DSPs or similar devices. In addition, processing module/unit/logic can be implemented as firmware or functional circuitry within hardware devices. Further, processing module/unit/logic can be implemented in any combination hardware devices and software components.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm is here, and generally, conceived to be a self-consistent sequence of operations leading to a desired result. The operations are those requiring physical manipulations of physical quantities.

It should be borne in mind, however, that all of these and similar terms are to be associated with the appropriate physical quantities and are merely convenient labels applied to these quantities. Unless specifically stated otherwise as apparent from the above discussion, it is appreciated that throughout the description, discussions utilising terms such as those set forth in the claims below, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments of the disclosure also relate to an apparatus for performing the operations herein. Such a computer program is stored in a non-transitory computer readable medium. A machine-readable medium includes any mechanism for storing information in a form readable by a machine (e.g., a computer). For example, a machine-readable (e.g., computer-readable) medium includes a machine (e.g., a computer) readable storage medium (e.g., read only memory ("ROM"), random access memory ("RAM"), magnetic disk storage media, optical storage media, flash memory devices).

The processes or methods depicted in the preceding figures may be performed by processing logic that comprises hardware (e.g. circuitry, dedicated logic, etc.), software (e.g., embodied on a non-transitory computer readable medium), or a combination of both. Although the processes or methods are described above in terms of some sequential operations, it should be appreciated that some of the operations described may be performed in a different order. Moreover, some operations may be performed in parallel rather than sequentially.

Embodiments of the present disclosure are not described with reference to any particular programming language. It will be appreciated that a variety of programming languages may be used to implement the teachings of embodiments of the disclosure as described herein.

In the foregoing specification, embodiments of the disclosure have been described with reference to specific exemplary embodiments thereof. It will be evident that various modifications may be made thereto without departing from the broader spirit and scope of the disclosure as set forth in the following claims. The specification and drawings are, accordingly, to be regarded in an illustrative sense rather than a restrictive sense.

What is claimed is:

1. A computer-implemented method to register point clouds for an autonomous driving vehicles (ADV), the method comprising:
   determining a frame pair size of one or more pairs of related poses of a plurality of poses of a plurality of point clouds of a region to be mapped;
   separating the region containing the plurality of point clouds and the corresponding poses into a plurality of clusters in response to the frame pair size being greater than a threshold;
   applying separately a first optimization model to the plurality of point clouds corresponding to the plurality of clusters to register the point clouds;
   merging the registered point clouds from the plurality of clusters to perceive a driving environment of the region surrounding the ADV; and
   repeatedly separating the registered point clouds from the plurality of clusters into an additional plurality of clusters and applying the first optimization model to the plurality of point clouds corresponding to the additional plurality of clusters until the registered point clouds converge.

2. The method of claim 1, further comprising applying a second optimization model to the plurality of points clouds of the region in response to the frame pair size being determined to be smaller or equal to the threshold.

3. The method of claim 1, wherein the frame pair size of a related pair of the plurality of poses of the region comprises a geometric distance between the related pair.

4. The method of claim 1, wherein applying separately a first optimization model to the plurality of point clouds corresponding to the plurality of clusters comprises solving a bundle adjustment equation of an iterative closest point (ICP) model of one of the plurality of clusters by focusing on a partial subset of a plurality of decision variables in the one cluster and fixing the decision variables other than the partial subset.

5. The method of claim 4, wherein solving a bundle adjustment equation of an ICP model of one of the plurality of clusters by focusing on a partial subset of a plurality of decision variables in the one cluster and fixing the decision variables other than the partial subset comprises:

determining if one pose of a pair of poses of the plurality of poses in the one cluster is outside of the one cluster; and treating the one pose of the pair of poses as a constant when solving the bundle adjustment equation of the one cluster in response to the one pose of the pair of poses being determined to be outside of the one cluster.

6. The method of claim 1, wherein repeatedly separating the registered point clouds from the plurality of clusters into an additional plurality of clusters and applying the first optimization model to the plurality of point clouds corresponding to the additional plurality of clusters until the registered point clouds converge comprises:

determining if the registered point clouds from the plurality of clusters converge; and iteratively separating the region containing the registered point clouds from the plurality of clusters into a second plurality of clusters in response to the registered point clouds from the plurality of clusters are determined not to converge, and applying separately the first optimization model to the plurality of point clouds corresponding to the second plurality of clusters to register the point clouds until the registered point clouds from the second plurality of clusters converge.

7. The method of claim 1, wherein merging the registered point clouds from the plurality of clusters comprises merging using a pose graph algorithm.

8. The method of claim 1, wherein the sensor comprises a light detection and range (LIDAR) sensor.

9. A non-transitory machine-readable medium having instructions stored therein, which when executed by a processor, cause the processor to perform operations to register points clouds for an autonomous driving vehicles (ADV), the operations comprising:

determining a frame pair size of one or more pairs of related poses of a plurality of poses of a plurality of point clouds of a region to be mapped;

separating the region containing the plurality of point clouds and the corresponding poses into a plurality of clusters in response to the frame pair size being greater than a threshold;

applying separately a first optimization model to the plurality of point clouds corresponding to the plurality of clusters to register the point clouds;

merging the registered point clouds from the plurality of clusters to perceive a driving environment of the region surrounding the ADV; and repeatedly separating the registered point clouds from the plurality of clusters into an additional plurality of clusters and applying the first optimization model to the plurality of point clouds corresponding to the additional plurality of clusters until the registered point clouds converge.

10. The non-transitory machine-readable medium of claim 9, further comprising applying a second optimization model to the plurality of points clouds of the region in response to the frame pair size being determined to be smaller or equal to the threshold.

11. The non-transitory machine-readable medium of claim 9, wherein the frame pair size of a related pair of the plurality of poses of the region comprises a geometric distance between the related pair.

12. The non-transitory machine-readable medium of claim 9, wherein applying separately a first optimization model to the plurality of point clouds corresponding to the plurality of clusters comprises solving a bundle adjustment equation of an iterative closest point (ICP) model of one of the plurality of clusters by focusing on a partial subset of a plurality of decision variables in the one cluster and fixing the decision variables other than the partial subset.

13. The non-transitory machine-readable medium of claim 12, wherein solving a bundle adjustment equation of an ICP model of one of the plurality of clusters by focusing on a partial subset of a plurality of decision variables in the one cluster and fixing the decision variables other than the partial subset comprises:

determining if one pose of a pair of poses of the plurality of poses in the one cluster is outside of the one cluster; and treating the one pose of the pair of poses as a constant when solving the bundle adjustment equation of the one cluster in response to the one pose of the pair of poses being determined to be outside of the one cluster.

14. The non-transitory machine-readable medium of claim 9, wherein repeatedly separating the registered point clouds from the plurality of clusters into an additional plurality of clusters and applying the first optimization model to the plurality of point clouds corresponding to the additional plurality of clusters until the registered point clouds converge comprises:

determining if the registered point clouds from the plurality of clusters converge; and iteratively separating the region containing the registered point clouds from the plurality of clusters into a second plurality of clusters in response to the registered point clouds from the plurality of clusters are determined not to converge, and applying separately the first optimization model to the plurality of point clouds corresponding to the second plurality of clusters to register the point clouds until the registered point clouds from the second plurality of clusters converge.

15. A data processing system, comprising:

a processor; and a memory coupled to the processor to store instructions, which when executed by the processor, cause the processor to perform operations to register point clouds for an autonomous driving vehicles (ADV), the operations including:

determining a frame pair size of one or more pairs of related poses of a plurality of poses of a plurality of point clouds of a region to be mapped, separating the region containing the plurality of point clouds and the corresponding poses into a plurality of clusters in response to the frame pair size being greater than a threshold, applying separately a first optimization model to the plurality of point clouds corresponding to the plurality of clusters to register the point clouds, merging the registered point clouds from the plurality of clusters to perceive a driving environment of the region surrounding the ADV, and repeatedly separating the registered point clouds from the plurality of clusters into an additional plurality of clusters and applying the first optimization model to the plurality of point clouds corresponding to the additional plurality of clusters until the registered point clouds converge.

16. The data processing system of claim 15, wherein the operations further comprise applying a second optimization model to the plurality of points clouds of the region in response to the frame pair size being determined to be smaller or equal to the threshold.

17. The data processing system of claim 15, wherein the frame pair size of a related pair of the plurality of poses of the region comprises a geometric distance between the related pair.

18. The data processing system of claim 15, wherein the operations for applying separately a first optimization model to the plurality of point clouds corresponding to the plurality of clusters comprises operations for solving a bundle adjustment equation of an iterative closest point (ICP) model of one of the plurality of clusters by focusing on a partial subset of a plurality of decision variables in the one cluster and fixing the decision variables other than the partial subset.

19. The data processing system of claim 18, wherein the operations for solving a bundle adjustment equation of an iterative closest point (ICP) model of one of the plurality of clusters by focusing on a partial subset of a plurality of decision variables in the one cluster and fixing the decision variables other than the partial subset comprises operations for:
  determining if one pose of a pair of poses of the plurality of poses in the one cluster is outside of the one cluster; and
  treating the one pose of the pair of poses as a constant when solving the bundle adjustment equation of the one cluster in response to the one pose of the pair of poses being determined to be outside of the one cluster.

20. The data processing system of claim 15, wherein the operations for repeatedly separating the registered point clouds from the plurality of clusters into an additional plurality of clusters and applying the first optimization model to the plurality of point clouds corresponding to the additional plurality of clusters until the registered point clouds converge comprise:
  determining if the registered point clouds from the plurality of clusters converge; and
  iteratively separating the region containing the registered point clouds from the plurality of clusters into a second plurality of clusters in response to the registered point clouds from the plurality of clusters are determined not to converge, and applying separately the first optimization model to the plurality of point clouds corresponding to the second plurality of clusters to register the point clouds until the registered point clouds from the second plurality of clusters converge.

* * * * *